United States Patent [19]

Kamgar-Parsi

[11] Patent Number: 5,923,776

[45] Date of Patent: Jul. 13, 1999

[54] OBJECT EXTRACTION IN IMAGES

[75] Inventor: Behrooz Kamgar-Parsi, Washington, D.C.

[73] Assignee: The United States of America as represented by the Secretary of the Navy, Washington, D.C.

[21] Appl. No.: 08/652,044

[22] Filed: May 23, 1996

[51] Int. Cl.⁶ ........................................ G06K 9/46
[52] U.S. Cl. ............................ 382/173; 382/270
[58] Field of Search ............................ 382/205, 270, 382/101, 102, 308, 173; 358/455, 465, 464, 453

[56] References Cited

U.S. PATENT DOCUMENTS

| | | | |
|---|---|---|---|
| 5,072,384 | 12/1991 | Doi et al. ........................... | 382/173 |
| 5,109,436 | 4/1992 | Machida et al. .................... | 382/270 |
| 5,583,659 | 12/1996 | Lee et al. ........................... | 358/455 |

OTHER PUBLICATIONS

Gregson. "Using Gradient Orientation for Edgel Detection." Proceedings, IEEE Pacific Rim Conference on Communications, Computers and Signal Processing, pp. 293–296, Jun. 1989.

B. Kamgar–Parsi, Automatic Target Extraction in Infrared Images, 1995 NRL Review, pp. 143–46.

Memorandum dated Jun. 2, 1995 from Pat Staffieri to NRL "Code 1005" re distribution of document AA.

*Primary Examiner*—Jon Chang
*Attorney, Agent, or Firm*—Thomas E. McDonnell; Edward F. Miles

[57] ABSTRACT

A method and apparatus for extracting an object from an image, in which one locates a pixel within the image (the "central" pixel), and then sequentially compares the brightness of neighboring pixels, proceeding outward from the central pixel. In so doing, one determines the largest dropoffs in brightness between neighboring pixels, and uses these to determine a brightness threshold for extracting pixels belonging to the object. In a preferred embodiment, one determines the threshold by comparing the largest dropoffs, identifies overlapping regions of brightness level common to all the dropoffs, and sets the threshold at the midpoint of the common overlapping region.

13 Claims, 4 Drawing Sheets

OBJECT EXTRACTION IN IMAGES

BACKGROUND OF THE INVENTION

A fundamental problem in computer vision and image processing is image segmentation, or object extraction, in intensity, infrared, or other images. Examples of the applications to which this problem applies is object recognition, automatic target recognition, and scene analysis, not to mention monitoring and tracking of objects. Hence it is of great importance to have a dependable automated technique for target extraction. Current techniques require either user-supplied parameters or model-based templates to extract the pixels corresponding to a desired image from an overall image. Examples of techniques requiring user-supplied parameters include thresholding and edge detection. They are convenient, but they both require threshold values which, in general, cannot be calculated automatically. Model-based techniques may not require the supervision of a human operator, but they have other deficiencies: they are slow since the image orientation or scale may be different from that of the template, and they are crude and not very dependable since the object pose in the image and the model pose in the template may not agree. Thus model-based techniques have a low degree of resolution; for example, they may not distinguish between two types of aircraft since aircraft would look similar when compared to aircraft templates.

Of particular interest is infrared images, if only because all engines and living creatures give off heat, and thus appear bright in infrared images. It is well known that the detection of an object (or target) in an infrared image depends on its thermal contrast with the background. Accordingly, measures of target detectability (target metric), such as the difference between the mean target and background temperatures, or its modified versions also incorporating the standard deviation of the target's thermal variations, have been defined. These measures have been used to estimate the probability of the target detection by a human observer. They have thus been helpful in the design of infrared imaging systems. Typically, autonomous tracking of an infrared target begins after the detection and the identification of the target by a human operator. By knowing the type and the size (in the image) of the target, an appropriate template is supplied to the tracking system. The autonomous tracking then continues by modeling the target with the template and finding its best match in a sequence of images.

The above techniques are not (fully) automated. For automatic object extraction, image thresholding has received considerable attention. The problem however is how to calculate the threshold value. For this, a variety of techniques based on the image gray-level histogram have been proposed. The threshold is taken to be the gray level at the valley of a (hopefully) bimodal histogram-one having a val separating two histogram peaks, with the peaks representing the object and the background, respectively. A frequent problem is that the background itself may be multimodal (i.e. contain plural objects). Furthermore, the valley is often gradual, and its bottom is not well defined, often making the calculation of the threshold less accurate than needed.

SUMMARY OF THE INVENTION

The invention concerns an apparatus and method for extracting an object from an image in which a pair of transverse axes is disposed on the object in the image, choosing a pixel on one of the axes, the pixel being denominated the central pixel, and repeatedly: (a) choosing a neighboring pixel, the neighboring pixel being located away from the reference pixel in a direction transverse to the axes, (b) determining the dropoff in brightness between the neighboring pixel and the reference pixel (c) replacing the reference pixel by the neighboring pixel (d) and repeating (a) through (c) a preselected number of times to generate numerous dropoffs. Thereafter, one selects the largest of these dropoffs and use these to determine a threshold for extracting said object. In one embodiment, one inspects the dropoffs to find an overlapping range of pixel brightness common to the dropoffs, and sets the extraction threshold to a level within the overlapping range, preferably its midpoint.

These and other features and advantages are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
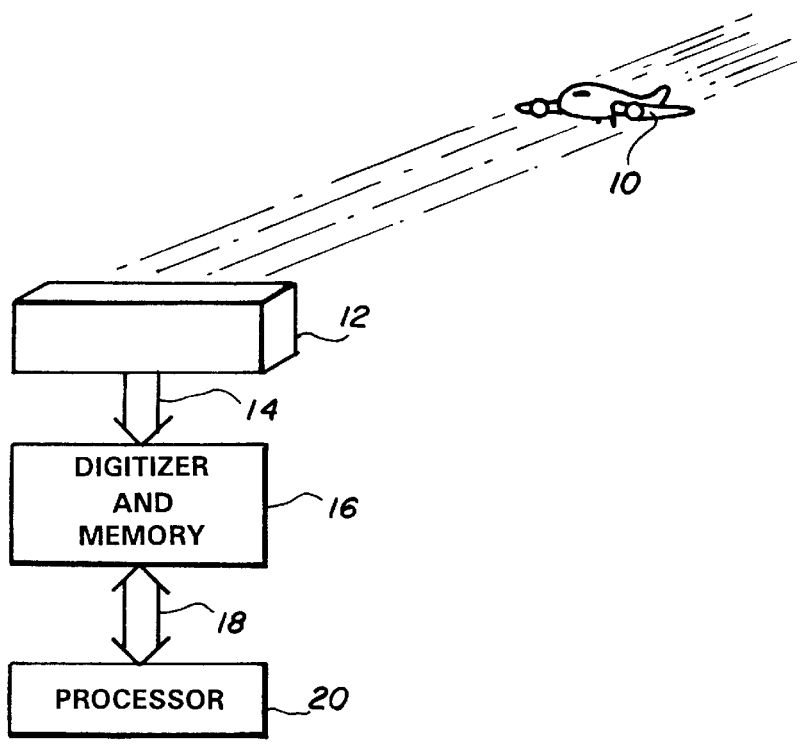
FIGS. 1 is a schematic block diagram illustrating hardware for practicing an embodiment of the invention.

With reference to the drawing figures, and in particular FIG. 1, an object 10 is shown (here, in the form of an aircraft for illustrative purposes) disposed in the line of sight of an imager 12. Imager 12 receives electromagnetic radiation either produced by, or reflected from, object 12, and transduces the radiation incident on the aperture of imager 12 into conventional pixel form. Digitizer 16 transduces the electro-optical pixels thus produced into digital form, which are stored in digital memory for processing by processor 20, which can be any appropriate digital computer. Imager 12 can be any known device which can form electro-optical images, and is preferably a two dimensional array of photo-diodes or photo-transistors, coupled to charged coupled devices (not shown) or the like for marching the pixels from imager 12 via line 14 to digitizer 16.

Figure 2:
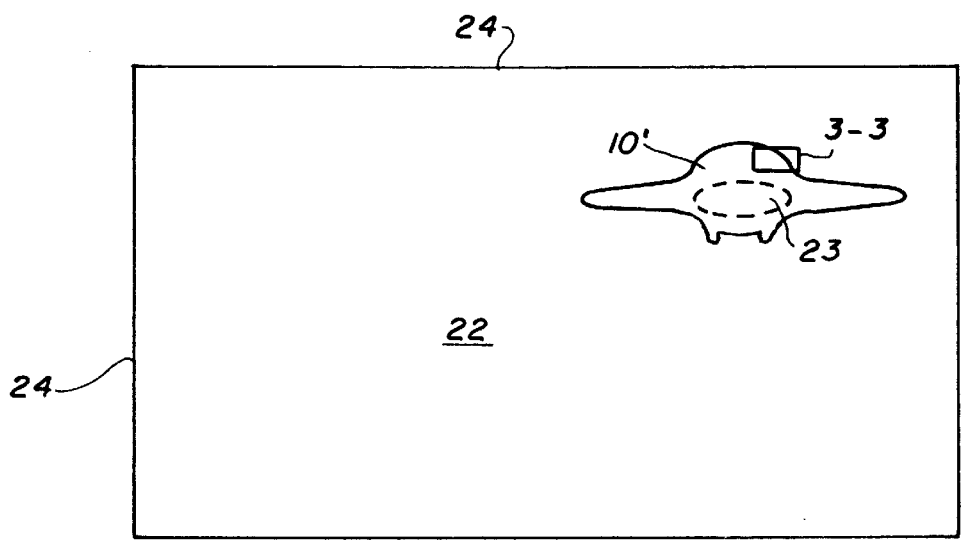
FIG. 2 is a schematic illustration of an image produced by hardware of FIG. 1.
Figure 3:
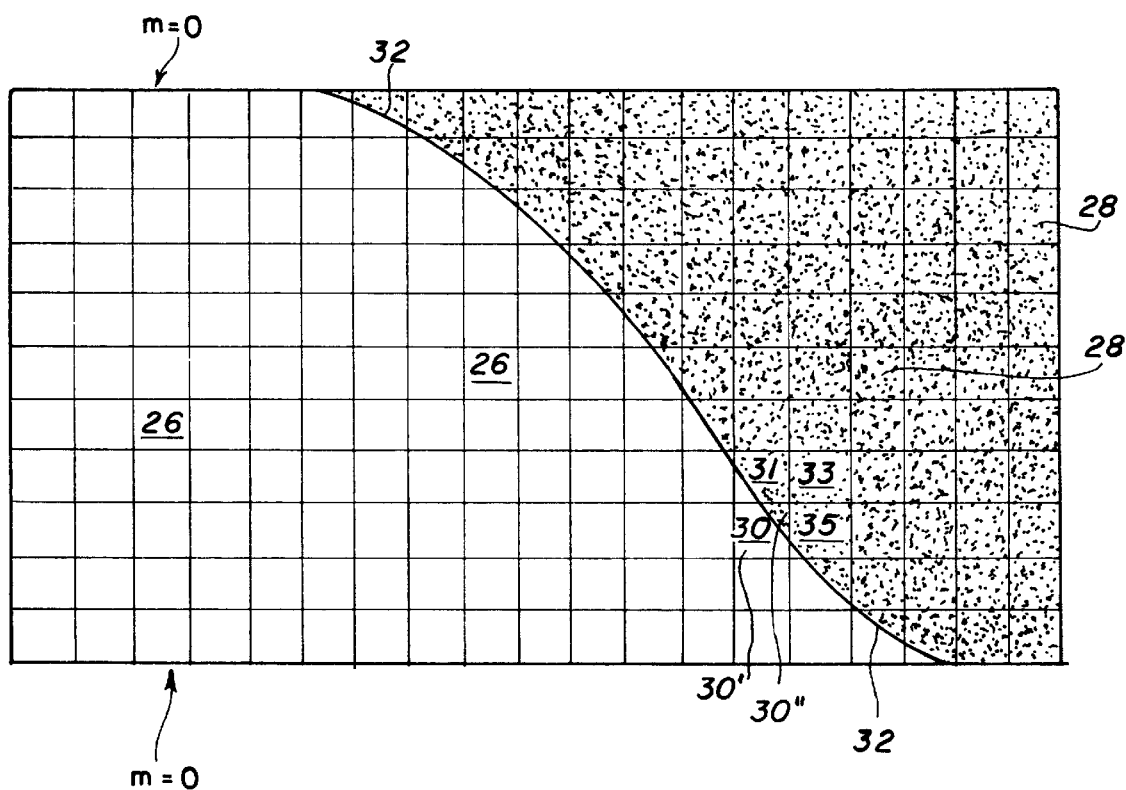
FIG. 3 is a schematic illustrating boxed-in area 3—3 of FIG. 2.

FIGS. 2–3 show schematically the image 22 thus recovered. In FIG. 2, the boundary of image 22 is indicated by frame 24, and this frame contains outline 10' the pixels surrounded by this outline being the pixels in image 22 corresponding to object 10. (For simplicity, this portion of image 22 is hereafter called "object 10'," and "object 10" refers to the physical object which produced the radiation resulting in 10' in image 22.) Object 10' contains a region 23 of especially high brightness, e.g. if the image 22 is of the infrared, and object 10' is of an aircraft, bright spot 23 could correspond to a hot spot on aircraft 10, for example its engine or jet exhaust. (Object 10' may, of course, be of uniform brightness and thus contain no distinguishable portion 23, in which case the "hot" portion would be all of object 10'.) FIG. 3 shows a detail of the portion of object 10' surround by box 3—3 of FIG. 2, and is in the form of a rectangular grid in which each square in the grid corresponds to a pixel in image 22, or, more particularly, the area in the field of view of image 22 covered by one transducer of digitizer 12 within area 3—3, for example a two dimensional grid of photo-transistors. Dark rectangles (e.g. 28) represent pixels outside of object 10', and bright rectangles (e.g. 26) represent pixels within object 10' (or, transducers which detected radiation from object 10). At the periphery of object 10' lies a boundary 32 between dark and bright pixels. Pixels crossed by this boundary (e.g. 30) are only partially illuminated by radiation from object 10 (e.g. portion 30' of pixel 30, as opposed to unilluminated portion 30"). As a result, the brightness which imager 12 detects for such boundary pixels will be intermediate between the brightness detected for pixels 26 within object 10' and pixels outside object 10'.

Figure 4:
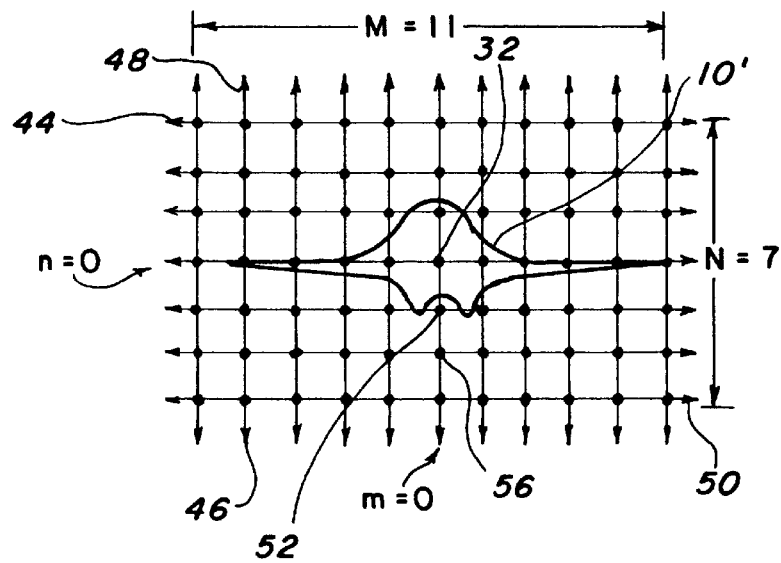
FIG. 4 is another schematic illustration of an image produced by hardware of FIG. 1.

FIG. 4 shows this information somewhat differently. In FIG. 4, the dots represent schematically pixels of image 22 containing object 10'. FIG. 4 presents an N×M array (N rows and M columns) of pixels which surround object 10' fully, but are preferably only a subportion of image 22 as a whole. (In the example of FIG. 3, the array is 7×11, but this is merely exemplary.) The central row and column, indicated by n=0 and m=0, intersect at a central pixel 32.

Figure 5:
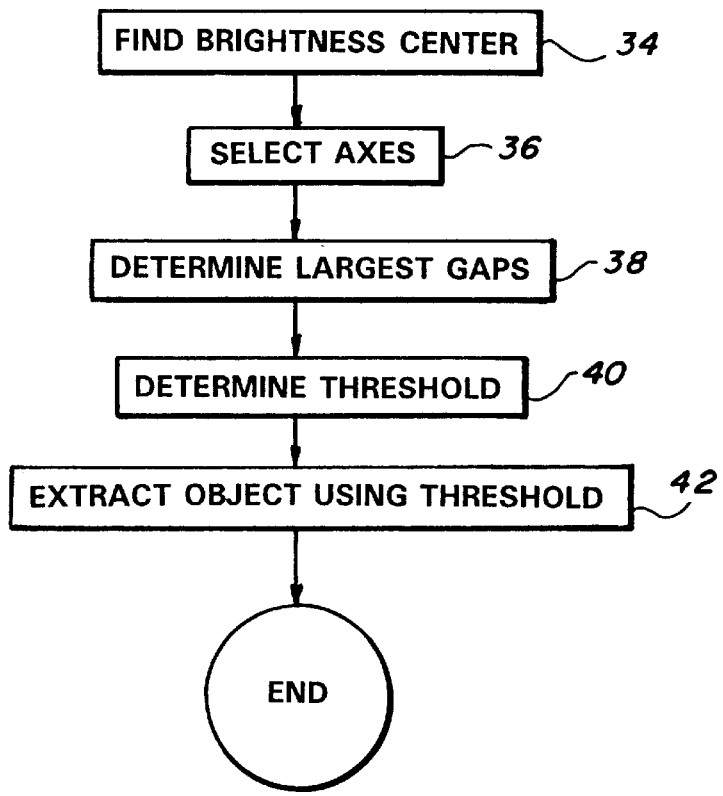
FIG. 5 is a flow diagram illustration processing of an image according to an embodiment of the invention.
Figure 6A:
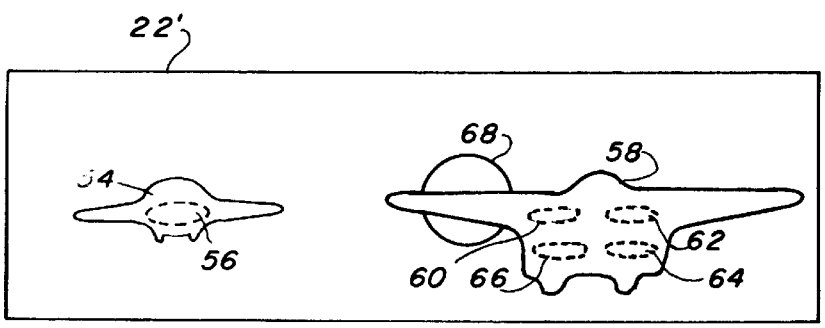
FIGS. 6a through 6d are schematic block diagrams, similar to that of FIG. 2, illustrating an image containing plural objects.
Figure 6B:
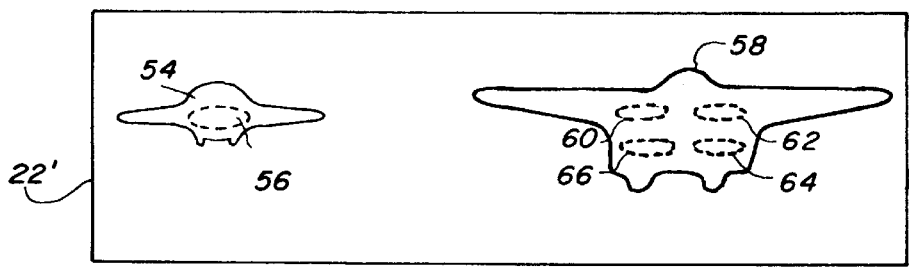
Figure 6C:
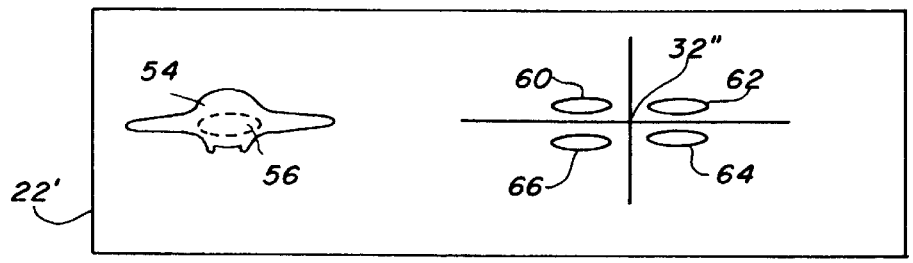
Figure 6D:
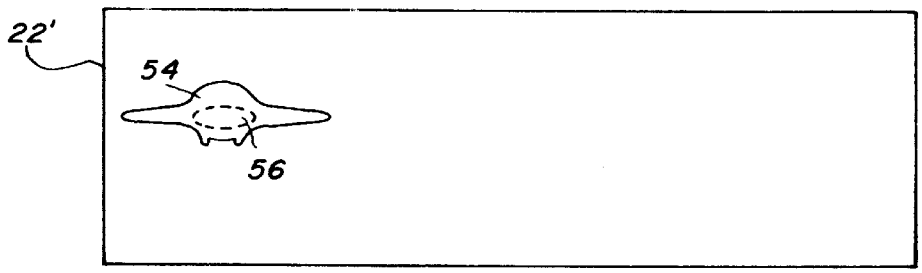

Operation of processor 20 is illustrated by the flow chart of FIG. 5. Processor 20 inspects the brightness levels of pixels within the image, and selects one indicative of the brightest portion, or brightness center, of object 10' (34). One could do this by simply selecting the brightest pixel in the array; however, this leaves processor 20 vulnerable to misinterpreting noise or other anomalies as the brightness center. Preferably, processor 20 guards against this by selecting a group of pixels from the image array which are the very brightest (these pixels being illustrated schematically as the portion of object 10' enclosed by dotted lines 23 in FIG. 2). Processor 20 does this by any standard means, for example selecting those pixels whose brightness is within 90% of the brightest pixel in the array (90%, of course, being merely exemplary of a highly exclusory criterion). To state this differently, those pixels whose brightness exceeds ab, where b is the brightness of the brightest pixel and a is a cutoff discriminant. Processor 20 then examines the selected pixels to determine a consensus location which is representatively central to the selected bright pixels (hereafter, the "central pixel," indicated by 32 in FIG. 4). An example of a criterion to do this is mathematically averaging the position of the bright pixels; another is to weight such an average by the brightness of each pixel. In each case, one could refine the selection process by, prior to applying this criterion, culling the selected pixels to exclude ones which are unusually distant, which would likely represent anomalies rather than object 10'. One way to perform such a culling would be to calculate the distances of each bright pixel to the other ones, and any such pixel further distant from a selected number of bright pixels than a preset distance would be excluded from the set of bright pixels, repeating this until the members of the set became constant. One way to speed up this process is to eliminate pixels which are less bright than others, e.g. consider only pixels which are within 95% of the brightest pixel.

Processor 20 then selects the pixels to be the axes (36). For simplicity it is preferred that the axes be chosen symmetrically disposed about central pixel 32. One could do this by using an a priori knowledge of the apparent size of objects one would expect in image 22, and preselect axes size to comfortably enclose such objects. However, there is no requirement that the axes be symmetrically sized. If, for example, object 10' were highly asymmetric, one might wish processor 20 to assign the axes by first locating its brightness center (central pixel), and then proceed pixel by pixel in the four orthogonal directions from the brightness center and examine each pixel until reaching effectively dark pixels. Upon finding a preset number of sequential pixels with no measured, or uniform, brightness, set the last of these employed pixels as an axis terminus. To make this more robust, one could look at more directions, e.g. starting from the other pixels in the same row and column which intersect at pixel 32, and proceed similarly from each to locate dark image patches. Moreover, there is no strict requirement that the axes be perpendicular, as opposed to merely traverse, or that they align with the rows and columns of pixels in image 22. As discussed below, the invention contemplates comparison of pixels with their adjacent neighbors. Axes which are not aligned with the rows and columns of pixels will complicate the identification of adjacent neighbors, and those neighbors will not necessarily be the nearest neighbors, which will make practice of the invention less accurate.

For convenience of explanation, the pixels in the N×M array of FIG. 4 are numbered n=0, . . . , ±(N−1)/2, and m=0, . . . , (M−1)/2, with the axes containing n=m=0 intersecting at the central pixel 32. Processor 20 then proceeds to start at central pixel 32, and compares the intensity of neighboring pixels to determine the boundary of object 10', in a manner best understood with reference to FIG. 4.

In FIG. 4 various, of the pixels are schematically illustrated as connected by arrows, four of which are numbered 44, 46, 48, 50. These arrows extend from each of the axes, and extend, respectively, in four orthogonal directions, +n (up from the n=0 axis in the drawing figure, reference number 48), −n (down from the n=0 axis in the drawing figure, reference number 46), +m (to the right of the m=0 axis, reference number 50) and −m (to the left away from the m=0 axis, reference number 44). The arrows represent traces, or paths, through the pixels which processor 20 preferably follows in locating the boundary of object 10'. Starting at pixel 32, processor 20 compares the brightness of pixel 32 with nearest neighboring pixel 52, then compares the brightness of pixel 52 with its nearest neighbor 56, and so on until processor 20 comes to the end of the N×M array. Processor 20 then repeats this for another trace (e.g. starting again at pixel 32, but proceeding in the +n direction). In this manner, processor 20 sequentially compares the brightness of all nearest neighboring pixels along the two traces which begin at pixel 32, and extend along the m=0 axis. In making the comparisons, processor 20 records the pixels in each trace which produces the largest magnitude dropoff in the brightness (e.g. the three such highest dropoffs). Pixel 30 in FIG. 3 is such a pixel: it is only illuminated by radiation from object 10, but its immediate neighbors 31, 33, 35 receive little radiation. Processor 20 repeats this for each trace shown by an arrow in FIG. 5, i.e. two traces starting from each pixel on the m=0 or n=0 axis, each of the two traces proceeding in opposite directions (e.g. traces 46 and 48). Upon completion, processor 20 will have effectively inspected the entire periphery of object 10' for pixels which produce maximum brightness dropoff, which processor 20 records.

Processor 20 uses the dropoffs to establish a threshold level to test all pixels within the N×M array for membership in object 10' (40). This could be done by any known algorithm, for example determining the brightness level found in the largest number of dropoffs. Preferably, however, processor 20 sequentially compares the levels of all the dropoffs and determines a brightness range common to each, and sets the threshold to be the midpoint of the common range. For example, if one dropoff is from 9 to 3 units of brightness, and another is from 7 to 2 units, the overlap is a brightness level of between 3 and 7 units. If a third dropoff is between 8 and 4 units, the cumulative overlap would then be between 4 and 7 units, etc. If this remained the overlap after considering all the candidates, processor 20 would preferably set the threshold at an average of 4 and 7 (i.e. 5.5). Before performing this overlapping analysis, processor 20 preferably compares all the dropoffs to a preselected discriminant to remove dropoff values which are anamolously high or low, and which likely result from some patches of the object (e.g. the engine), noise, hardware errors, or the like. Alternatively, processor 20 may also form a histogram of the dropoffs, and exclude those which occur fewer than a preset number of times (or represent less than a preset fraction of total dropoffs), because a dropoff level with a very low rate of occurrence likely results from an anomaly. Processor 20 may advantageously sort the dropoffs from highest to lowest, and calculate the overlaps in the resulting order, so as to minimize the possibility that any of the dropoffs will fall outside of a tentative consensus.

Processor 20 would then use this threshold to extract object 10' in image 22 (42), preferably by comparing all pixels in the N×M array to the threshold, and assigning to object 10' all pixels whose brightness level exceeds the threshold. Alternatively and preferably, processor 20 does this by starting at a pixel known to be within object 10', e.g. central pixel 32, and comparing the threshold to all next neighbors of that pixel. Those pixels whose brightness exceeds the threshold are noted as belonging to object 10', those whose brightness does not are excluded, and the pixels included by this series of comparisons are noted for revisitation to similarly inspect each of their near neighbors against the threshold. (This is sometimes called inspection for eight fold connectivity, because each pixel in a two dimensional array such as shown in FIGS. 3 and 4 have eight immediate near neighbors.)

FIGS. 6a through 6d show an image 22' having three objects 54, 58, 68, in which object 54 has an especially bright portion 56 and object 58 has disconnected bright patches 60, 62, 64, 66. Object 54 is radially closest to imager 12 and object 68 is radially farthest, making object 54 likely the brightest and object 68 least bright, etc.

Processor 20 preferably resolves these objects by first locating a central pixel as above described, e.g. using spatial averaging of center of mass averaging of brightest pixels. If the resultant central pixel lies within object 58 (as it likely will because object 58 is so large), then processor 20 will proceed as before to extract object 58. Processor 20 will remove object 58 from image 22' leaving only 54 and 68. The new central pixel is likely to lie within 54, so that the processor 20 will next extract 54 and after removing both 58 and 54 from image 22' will extract 68.

If the central pixel lies outside an object, as it nonetheless might in FIG. 6 because objects 54, and 58 and 68, are so far separated from one another, this indicates that the image has plural objects, even before any of them is extracted. Noting this, processor 20 compares the pixels in image 22' to an increasingly large series of brightness discriminants, eliminating those which fall below such a discriminant, until only a few, localized pixels remain. These few remaining pixels necessarily belong to the brightest object in image 22', here bright spot 56 of object 54, and are used to determine a central pixel for object 54 specifically. Having done so, processor 20 then extracts the pixels belonging to object 54. Processor 20 removes object 54 from image 22', and proceeds to extract objects 58, 68, which, because they overlap, will be treated as one object. Processor 20 will then resolve the two by first extracting 58 in a manner similar to that described above. Also, if the detectors in imager 12 are frequency sensitive, processor 20 could also further discriminate among overlapping objects by color.

The invention has been described in what is considered to be the most practical and preferred embodiments. It is recognized, however, that obvious modifications to these embodiments may occur to those with skill in this art. For example, although discussed herein as an image extracter, one could also use the invention as an image enhancer. Accordingly, the scope of the invention is to be discerned from reference to the appended claims, wherein:

I claim:

1. A method for extracting an object from an image, comprising:

forming an image containing an object, said method further comprising:
   a. disposing a pair of transverse axes on said object;
   b. choosing a pixel on one of said axes, said pixel being denominated the reference pixel;
   c. choosing a neighboring pixel, said neighboring pixel being located away from said reference pixel in a direction transverse to said one of said axes;
   d. determining the dropoff in brightness between said neighboring pixel and said reference pixel;
   e. replacing said reference pixel by said neighboring pixel;
   f. repeating steps c through e a preselected number of times;
   g. selecting a preselected number L, and selecting the L largest of said dropoffs; and
   h. using said largest of said dropoffs to determine a threshold for extracting said object.

2. An apparatus for extracting an object from an image, said image containing an object, comprising:

an imager for forming said image, and a processor, said processor being adapted for:
   disposing of a pair of transverse axes on said object;
   choosing a pixel on one of said axes, said pixel being denominated the reference pixel;
   choosing a neighboring pixel, said neighboring pixel being located away from said reference pixel in a direction transverse to said one of said axes;
   determining the dropoff in brightness between said neighboring pixel and said reference pixel;
   replacing said reference pixel by said neighboring pixel;
   repeating said choosing a pixel, choosing a neighboring pixel, determining said dropoff, and said replacing said reference pixel, said repeating being done a preselected number of times;
   said apparatus further comprising:
      means for selecting a preselected number L, and selecting the L largest of said dropoffs; and
      means for using said largest of said dropoffs to determine a threshold for extracting said object.

3. The method of claim 1, wherein said choosing of said reference pixel comprises:

selecting a preselected number of pixels in said object, said preselected number of pixels being the brightest of said image; and using said preselected number of pixels for determining said reference pixel.

4. The method of claim 3, wherein said determining of said reference pixel comprises averaging the spatial position of said preselected number of pixels within said image.

5. The method of claim 4, wherein said averaging is the averaged spatial position of said preselected number of pixels within said image, weighted by the intensities of said preselected number of pixels.

6. The method of claim 3, wherein said selecting a preselected number of pixels further comprises:
   a'. determining whether any of said preselected number of pixels are more distant from the others of said preselected number of pixels by a preselected nearness criterion;
   b'. eliminating from said preselected number of pixels those which are more distant by said preselected nearness criterion; and
   repeating said steps a' and b' until the number of pixels in said preselected number of pixels becomes constant.

7. The method of claim 1, wherein said step h to determine said threshold for extracting said object comprises:
   determining the overlapping range of said dropoffs; and
   setting said threshold to be within said range.

8. The method of claim 7, wherein said setting of said threshold causes said threshold to be the midpoint of said range.

9. The method of claim 1, wherein said step g for selecting said L largest of said dropoffs causes eliminating from said largest of said dropoffs those which exceed a preselected magnitude.

10. The method of claim 1, wherein said method further comprises extracting said object by:
    comparing each pixel in said image to said image to said threshold; and
    identifying as part of said object each pixel whose intensity exceeds said threshold.

11. The method of claim 1, wherein said method further comprises:
    a". identifying pixels immediately adjacent said reference pixel having eight-fold symmetry with said reference pixel;
    b". comparing each of said pixels immediately adjacent said reference pixel to said threshold to identify those pixels which exceed said threshold; and
    c". identifying as part of said object said those pixels which exceed said threshold.

12. The method of claim 11, wherein said those pixels which exceed said threshold are denominated the reference pixel set, said method further comprising:
    a'''. for each member of said pixel set;
    b'''. identifying neighboring pixels to said each member, said neighboring pixels being immediately adjacent said each member and having eight-fold symmetry therewith;
    c'''. determining which of said each of said neighboring pixels exceeds said threshold;
    d'''. identifying as part of said object said those neighboring pixels which exceed said threshold;
    e'''. making those pixels identified in step d''' a new reference pixel set; and
    f'''. iteratively repeating steps a''' through e''' until the number of pixels identified as part of said object becomes constant.

13. The method of claim 1, wherein said choosing said reference pixel comprises:
    selecting a preselected number of the brightest pixels in said image;
    applying a selected nearness criterion to each of said preselected number of said pixels to determine if said each of said preselected number of pixels is distant from the others of said preselected number by a preselected amount;
    removing from said preselected number a pre set number of the least bright pixels; and
    iteratively repeating said steps for applying and removing, until each of said preselected number of pixels is distant from the others of said preselected number by said preselected amount.

* * * * *